Patented Oct. 31, 1939

2,178,054

UNITED STATES PATENT OFFICE 2,178,054

AZO DYESTUFFS AND PROCESS OF MAKING SAME

Fritz Straub and Willi Widmer, Basel, Switzerland, assignors to Society of Chemical Industry in Basle, Basel, Switzerland No Drawing. Application April 11, 1938, Serial No. 201,461. In Switzerland April 15, 1937

8 Claims. (Cl. 260—197)

This invention relates to the manufacture of azo dyestuffs by coupling a diazo-compound of an amine of the general formula

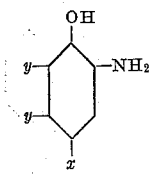

wherein $x$ is a nitro-group or a methyl-group, one $y$ is a sulfonic acid group and the other $y$ is hydrogen, with a dihalogenated hydroxynaphthalene capable of coupling in 2-position.

Parent materials serving as diazo-compounds of the amines of the above formula are, for example 4-nitro-2-diazo-1-hydroxybenzene-6-sulfonic acid, 4-methyl-2-diazo-1-hydroxybenzene-6-sulfonic acid and 4-methyl-2-diazo-1-hydroxybenzene-5-sulfonic acid. A mixture of the last-named two diazo-compounds may be used, such being obtainable by application of known methods to 1-hydroxy-2-nitro-4-methylbenzene.

Dihalogenated hydroxynaphthalenes which couple in 2-position are, for example, 1-hydroxynaphthalenes containing one halogen atom in 4- or 5-position and the other halogen atom in 6-, 7- or 8-position. Chlorine and bromine come especially into consideration as substituents. The use of 1-hydroxynaphthalene halogenated in 5- and 8-position, for example, 1-hydroxy-5:8-dichloronaphthalene and 1-hydroxy-5:8-dibromonaphthalene is particularly advantageous.

The diazo-compound may be coupled with the dihalogenated hydroxynaphthalene in an alkaline medium.

The dyestuffs obtainable by the invention are especially suitable for dyeing animal fibres, for instance wool.

These dyeings may be after-chromed in the usual manner, whereby blue and olive dyeings which are very fast are obtained. The dyestuffs may be used with advantage by the so-called meta-chrome process, a salt of hexa-valent chromium, for example an alkali chromate, being added to the bath.

The following examples illustrate the invention, the parts being by weight:

Example 1

The diazo-compound made in known manner from 23.4 parts of 4-nitro-2-amino-1-phenol-6-sulfonic acid is coupled in an alkaline solution with 22.5 parts of 5:8-dichloro-1-hydroxynaphthalene and the dyestuff thus obtained is filtered and dried.

It is a dark brown-red powder soluble in hot water and in dilute caustic soda lye to a red-violet solution and in concentrated sulfuric acid to a green solution. It dyes wool in an acid bath reddish blue tints which are converted by after-chroming into a fast olive green of excellent fastness to fulling and potting. By the one-bath chrome process there is also obtained an olive-green dyeing of excellent fastness to fulling and light.

Example 2

20.3 parts of 2-amino-4-methyl-1-phenol-5-sulfonic acid are diazotized in known manner and coupled in alkaline solution with 22.5 parts of 5:8-dichloro-1-hydroxynaphthalene. The dyestuff is salted out, filtered and dried.

It is a brown-red powder soluble in water to a violet solution, in dilute caustic soda solution to a blue-red solution and in concentrated sulfuric acid to a blue-grey solution. It dyes wool in an acid bath bluish Bordeaux red tints which are converted by after-chroming into a vivid marine blue of excellent fasteness to fulling and light. The dyestuff is applied with advantage to dyeing wool by the one-bath chrome process, also with production of a very vivid fast marine blue tint.

If 2-amino-4-methyl-1-phenol-6-sulfonic acid is substituted for the 2-amino-4-methyl-1-phenol-5-sulfonic acid there is obtained a dyestuff having similar properties.

Example 3

20 parts of a mixture of 2-amino-4-methyl-1-hydroxybenzene-5-sulfonic acid and 2-amino-4-methyl-1-hydroxybenzene-6-sulfonic acid obtained by the usual processes starting from 4-methyl-2-nitro-1-hydroxybenzene are diazotized in known manner and the diazo-compound is coupled in alkaline solution with 22.2 parts of 5:8-dichloro-1-hydroxynaphthalene. The mixture of dyestuffs thus obtained is salted out, filtered and dried.

It is a brown-red powder soluble in water to a violet solution, in dilute caustic soda solution to a blue-red solution and in concentrated sulfuric acid to a blue-grey solution. It dyes wool in an acid bath bluish Bordeaux red tints which are converted by after-chroming into a vivid marine blue of excellent fastness to fulling and light. This mixture of dyestuffs is applicable with advantage for dyeing wool by the one-bath chrome process, when very vivid and fast marine blue tints are also obtained.

What we claim is:

1. Process for the manufacture of azo dyestuffs, comprising coupling diazo-compounds of amines of the general formula

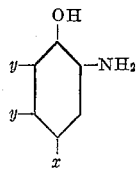

in which $x$ stands for a substituent selected from the group consisting of $CH_3$ and $NO_2$, one $y$ stands for a sulfonic acid group and the other $y$ stands for hydrogen, with dihalogenated hydroxy-naphthalenes capable of coupling in 2-position.

2. Process for the manufacture of azo dyestuffs, comprising coupling diazo-compounds of amines of the general formula

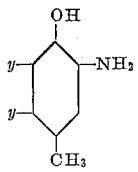

in which one $y$ stands for a sulfonic acid group and the other $y$ stands for hydrogen, with 5:8-dichloro-1-hydroxynaphthalene.

3. Process for the manufacture of an azo dyestuff, comprising coupling diazo-compounds of the amine of the formula

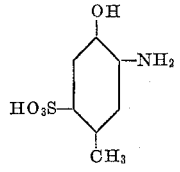

with 5:8-dichloro-1-hydroxynaphthalene.

4. Process for the manufacture of an azo dyestuff, comprising coupling diazo-compounds of the amine of the formula

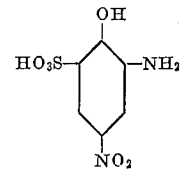

with 5:8-dichloro-1-hydroxynaphthalene.

5. Azo dyestuffs of the general formula

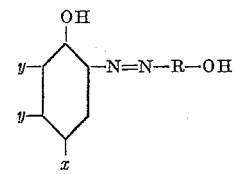

in which $x$ stands for a substituent selected from the group consisting of $CH_3$ and $NO_2$, one $y$ stands for a sulfonic acid group and the other $y$ stands for hydrogen, and R stands for a naphthalene radical which carries the OH-group in 1-position and the azo-group in 2-position and wherein two hydrogen atoms are replaced by halogen.

6. Azo dyestuffs of the general formula

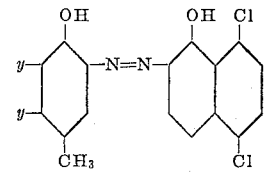

in which one $y$ stands for a sulfonic acid group and the other $y$ stands for hydrogen.

7. The azo dyestuff of the formula

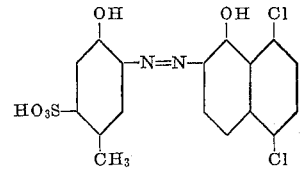

8. The azo dyestuff of the formula

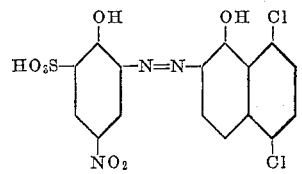

FRITZ STRAUB.
WILLI WIDMER.